Sept. 30, 1958　　　G. J. SHOMPHE　　　2,854,188
ELECTRIC BLOWER-VIBRATOR

Filed May 7, 1956　　　　　　　　　　　3 Sheets-Sheet 1

George J. Shomphe
*INVENTOR.*

Sept. 30, 1958  G. J. SHOMPHE  2,854,188
ELECTRIC BLOWER-VIBRATOR
Filed May 7, 1956  3 Sheets-Sheet 2

George J. Shomphe
*INVENTOR.*

Sept. 30, 1958        G. J. SHOMPHE        2,854,188
ELECTRIC BLOWER-VIBRATOR

Filed May 7, 1956        3 Sheets-Sheet 3

George J. Shomphe
*INVENTOR.*

United States Patent Office 2,854,188
Patented Sept. 30, 1958

2,854,188

ELECTRIC BLOWER-VIBRATOR

George J. Shomphe, Nashua, N. H., assignor, by mesne assignments, to Sanders Associates, Inc., Nashua, N. H., a corporation of Delaware Application May 7, 1956, Serial No. 583,225

6 Claims. (Cl. 230—117)

This invention relates to electric blowers and panel vibrators. More particularly, it is concerned with blower-vibrators which are generally of small size and compact design while having a relatively large capacity for causing the flow of fluids including gases.

It has long been a problem with dynamic meter movements to dislodge an indicator needle from an inertial position. Aircraft instrument panels, for example, hold a large number of indicators utilizing such meter movements. It has been suggested in the prior art to vibrate the instrument panel contniuously at a relatively high frequency for the purpose of freeing such indicator meter needles. It has also been found that various electronic apparatus and components develop local hot spots. It is desirable to equalize the temperatures in the area of the instrument panel by cooling such hot spots.

It is therefore an object of the present invention to provide an improved electric blower-vibrator.

It is a further object of the invention to provide an electric blower-vibrator of the type described, of small and compact design.

A still further object of the invention is to provide a blower-vibrator for efficiently freeing indicator meter needles on instrument panels while simultaneously effecting a relatively large flow of fluid or air.

In accordance with the invention there is provided a blower-vibrator which comprises a housing having a plenum chamber formed therein with a tangential passageway formed in the housing to conduct air from the chamber and circular recesses formed in each end of the housing around the chamber. Transverse, perforated circular disks are secured in the recesses to form end walls of the chamber, the disk having eccentrically disposed shaft-mounting holes formed therein. A hollow shaft member extends through the chamber and is supported by the shaft-mounting holes which enable accurate alignment of the shaft along a given axis by rotating the disks. A slotted laminated core is mounted on the shaft. Field windings in the core are arranged to produce a rotating field when connected to a source of polyphase current. Conductors extend from the field windings through the shaft. A centrifugal fan is mounted for rotation about the shaft member and comprises a cylindrical sleeve which has axially extending radial fins secured to the periphery of the sleeve and which are longer than the axial length of the sleeve to project into the space between the ends of the sleeve and the end walls. An unbalance-mass is eccentrically affixed to one of the end walls. A ring member is mounted on the fan for rotation adjacent the core whereby the rotating field around the core effects rotation of the centrifugal fan and mounting the blower-vibrator on a panel causes it to vibrate in accordance with the rotation of the rotor, while simultaneously directing fluid in a predetermined direction.

For a better understanding of the invention, together with other and further objects thereof, reference is made to the following description taken in connection with the accompanying drawings, and its scope will be pointed out in the appended claims.

By the novel design of the subject blower the construction of a very small unit is possible. In actual practice, blowers have been constructed in accordance with this design in which the blower and motor are housed in the structure of a one-inch cube that will deliver 3 cubic feet per minute of air. The blower operates satisfactorily in a temperature range of —55° C. to +125° C. for over 1000 hours.

Such a blower-vibrator may readily be used in connection with electronic equipment. Because of its performance and small size, it can be incorporated in the design of the equipment and located adjacent the heat generating components for spot-cooling. In sealed equipment where the casing is metal, to dissipate the heat, the blower may be mounted inside the casing for efficient transfer of heat to the casing, which then acts as a radiator, or the blower-vibrator may be mounted outside the casing to remove heat retained by the casing.

The blower-vibrator is designed to rotate at relatively high speeds, for example, 20,000 R. P. M. or 333 cycles per second. By attaching an unbalance-mass to the rotor in the manner to be described below, the blower-vibrator may be mounted on a panel to cause it to vibrate at this frequency while simultaneously providing a flow of cooling air.

Figure 1:
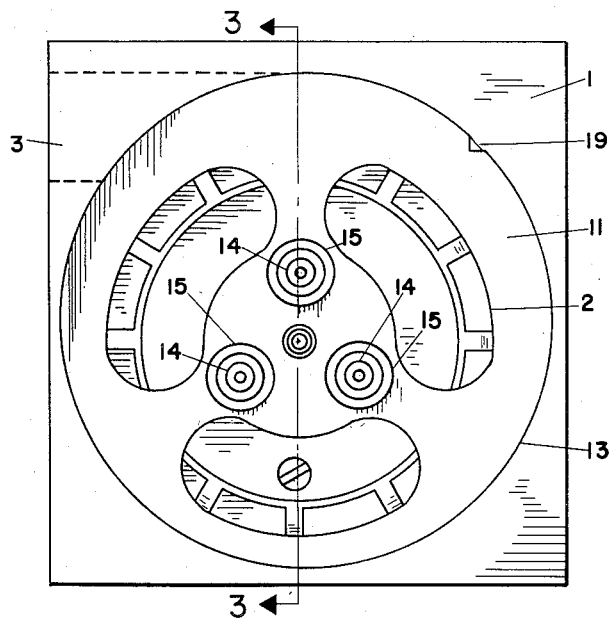
Fig. 1 is an end view of the electric blower showing the electric terminals and air inlet openings.
Figure 2:
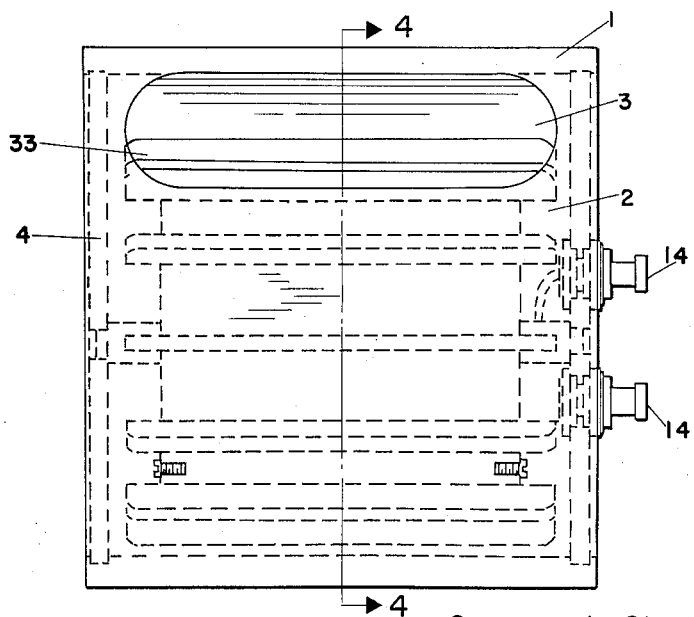
Fig. 2 is a side view of the electric blower showing an air outlet.
Figure 3:
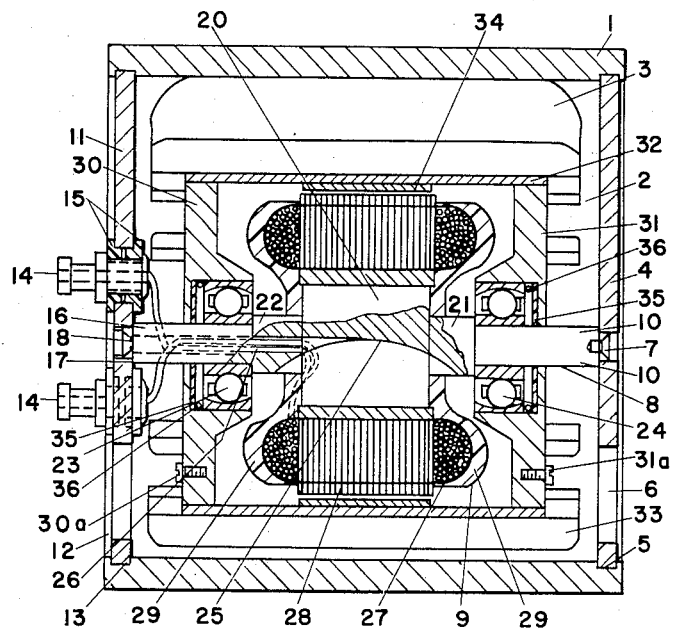
Fig. 3 is a sectional view taken along the line 3—3 of Fig. 1.
Figure 4:
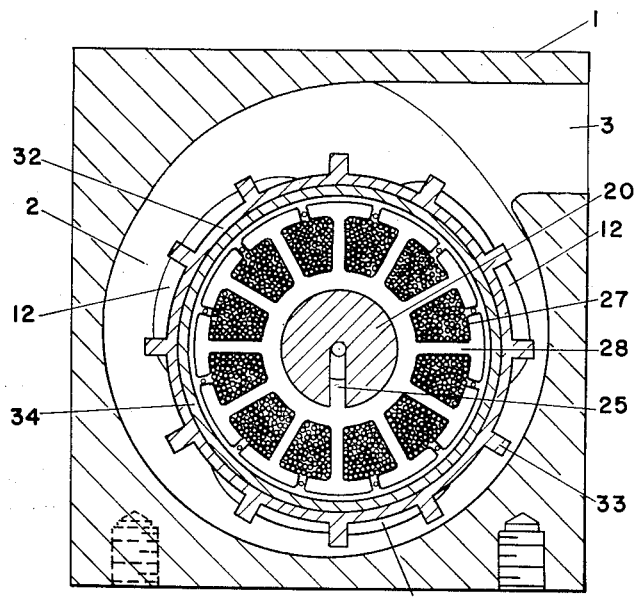
Fig. 4 is a sectional view taken along the line 4—4 of Fig. 2.

The blower shown in the drawings consists of a casing or housing 1 which may be formed from a block of metal or plastic. The block has a plenum chamber 2 extending therethrough which is generally involute in shape with a tangential outlet 3 through one face of the block for conducting air from the chamber to the outside of the housing. The block may have the involute chamber and tangential outlet machined therein or it may be molded or formed by die-casting. While the housing is shown as a block in the drawings it is to be understood that the casing may be of any external shape or form. An important feature is that it provides an involute-shaped chamber in which the rotor and motor elements are mounted.

An end cap 4 in the form of a perforated circular disk is transversely mounted in a circular recess 5 in the end of the housing, which end forms an end wall for chamber 2. One or more perforations or apertures 6 are formed in the end cap 4 for air inlets. A shaft-mounting hole 7 is formed in the end cap 4 in which a shaft portion 8 of the motor stator, generally indicated as 9, is secured. It will be noted that the shaft-mounting hole 7 is eccentrically disposed as related to the circular disk shape of the end cap 4 to locate the blower properly in the involute chamber 2. The hole 7 may be broached to receive the end portion of shaft 8 which may be formed with shoulders 10 by a milling cut on each side of the shaft portion 8 so that the shaft will be prevented from rotating with respect to the end cap 4.

An end cap 11 is provided similar to the end cap 4 and has apertures 12 formed therein for air inlets. It is mounted in a circular recess 13 formed in the housing 1. Several terminal lugs 14 are supported in the cap 11 by insulating bushings 15. A shaft portion 16, having an end formed with shoulder 17, is mounted in a shaft-mounting hole 18.

The shaft-mounting holes 7 and 18 define the axis of rotation of the blower. Eccentrically disposing the holes 7 and 18 relative to circular disks or end caps 4 and 11 enables accurate alignment of the shaft 8 along a given axis by rotating the circular disks. Both end caps 4 and 11 have a notch 19 or other indicia on the periphery to orient the end caps with respect to the housing during assembly to locate the stator 9 in chamber 2. End caps 4 and 11 are secured in recesses 5 and 13 by staking or any other suitable expedient to secure them firmly in place.

Figure 5:
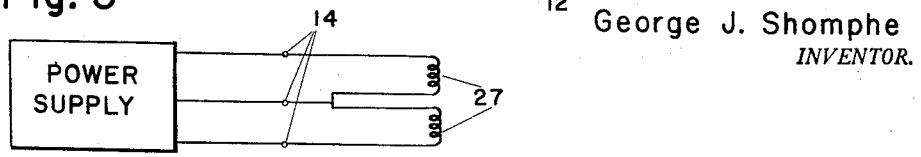
Fig. 5 is a circuit diagram showing a connection of the blower to a polyphase source.

The stator 9 is mounted on a cylindrical member 20 which is supported between end caps 4 and 11 by shaft portions 8 and 16. Enlarged shaft portions 21 and 22 afford shoulders against which conventional roller bearing assemblies 23 and 24 abut. Roller bearings 23 and 24 are mounted on shaft portions 16 and 8, respectively. The cylindrical member 20 and portions 8, 16, 21 and 22 may be formed as an integral member. A slot is cut as shown at 25 in the cylindrical member 20 and adjacent enlarged shaft portions 21 and 22 which intercepts a hole drilled through shaft portions 16 and 22 to afford passage for wires 26 from the terminal lugs 14 to polyphase windings 27 on stator 9. A slotted core 28 is of laminated construction and is assembled on the cylindrical member 20. Windings 27 are placed in the slotted core 28 in a conventional manner for polyphase windings so that when the three terminals 14 are connected to a suitable polyphase power supply, as shown in Fig. 5, a rotating field around the core 28 is produced. Windings 27 are sealed by insulating material 29 which is molded or otherwise secured over the ends of the windings on stator 9.

The blower-vibrator rotor or centrifugal fan comprises a pair of end members 30 and 31 carried by the outer races of bearings 23 and 24. A washer 35 of tough plastic material having a low coefficient of friction, such as Teflon, trademark of E. I. du Pont de Nemours and Company for tetra-fluoro-ethylene, is held in place between each of the outer races of bearings 23 and 24 by a pair of resilient springs 36. The springs 36 not only hold the Teflon washers in place, but separate them from the moving parts of the ball bearings. The washers are necessary to keep dust from getting into the ball bearings. Sleeve 32 is mounted on members 30 and 31 and rotates therewith around the shaft of stator 9. The members 30 and 31 are preferably formed of a relatively light material, such as aluminum. A pair of unbalance-masses, screws 30a and 31a, respectively, are each inserted in the members 30 and 31 and eccentrically disposed as shown. The screws are formed of a heavy material relative to the members 30 and 31, for example, steel, to unbalance the rotor. Radial fins 33 extend axially of sleeve 32 and may be formed integrally therewith. It will be noted that the ends of fins 33 extend beyond sleeve 32 into the spaces between members 30 and 31 and end caps 4 and 11 of the housing to form therewith radial passages through which air is caused to flow by centrifugal force from inlet openings 6 and 12 into chamber 2 and out passage 3. A hysteresis ring 34 is secured to the sleeve 32 and rotates therewith. The ring 34 is suitably spaced from the core 28 to cause magnetic polarization to be induced therein which, with the rotating field from the stator, effects rotation of the ring. Inasmuch as the ring 34 is secured to and carried by the sleeve 32, rotation of the centrifugal fan results.

Figure 6:
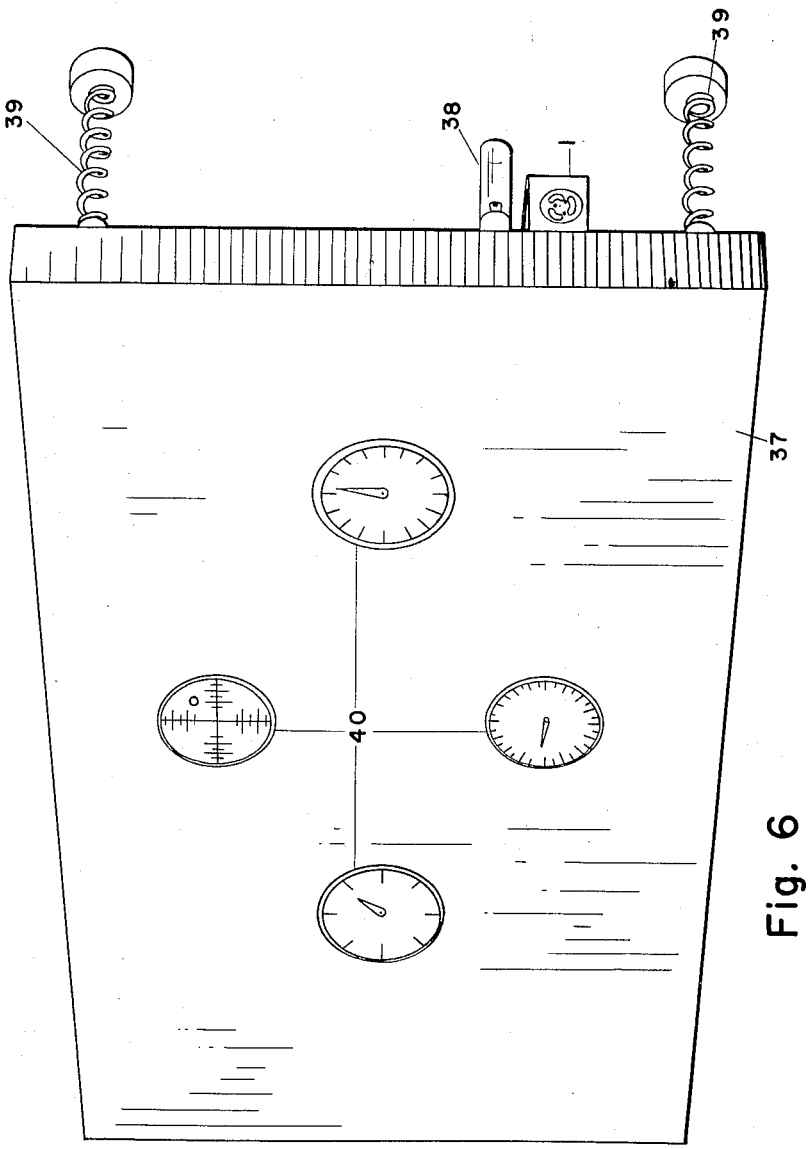
Fig. 6 is a perspective view of an instrument panel embodying the blower-vibrator of the present invention.

As shown in Fig. 6 the blower-vibrator is affixed to a panel 37 adjacent a vacuum tube 38. The panel 37 is resiliently mounted on springs 39. A number of indicating meters 40 are affixed to and carried by the panel 37.

It is to be understood that any suitable materials may be used in the construction of this blower. For ease of manufacture it has been found that the housing 1 and end caps 4 and 11 are readily made from aluminum. The shaft assembly comprising portions 8, 16, 21 and 22 are preferably made of non-magnetic, stainless steel. The ring 34 is preferably formed of chrome steel. The laminated core 28 utilizes transformer steel. The centrifugal fan assembly in the preferred embodiment is made of aluminum and the unbalance-masses 30a and 31a of steel.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An electric blower-vibrator, comprising: a housing having a plenum chamber formed therein, a tangential passageway formed in the housing to conduct air from said chamber, and circular recesses formed in each end of said housing around said chamber; transverse, perforated circular disks secured in said recesses forming end walls of said chamber, said disk having eccentrically disposed shaft-mounting holes formed therein; a hollow shaft member extending through said chamber and supported in said shaft-mounting holes, thereby enabling accurate alignment of said shaft along a given axis by rotating said disks; a slotted laminated core mounted on said shaft; field windings in said core arranged to produce a rotating field when connected to a source of polyphase current; conductors extending from said field windings through said shaft; a centrifugal fan mounted for rotation about said shaft member, said fan comprising a cylindrical sleeve, axially extending radial fins secured to the periphery of said sleeve, said fins being longer than the axial length of said sleeve to project into the space between the ends of said sleeve and said end walls; an unbalance-mass eccentrically affixed to one of said end walls; and a ring member mounted on said fan for rotation adjacent said core whereby the rotating field around said core effects rotation of said centrifugal fan and mounting said blower-vibrator on a panel causes it to vibrate in accordance with the rotation of said rotor while simultaneously directing fluid in a predetermined direction.

2. An electric blower-vibrator, comprising: a housing having a generally involute chamber formed therein and a tangential passageway formed in the housing to conduct air from said chamber; transverse members on each end of said housing forming end walls of said chamber, said transverse members having inlet apertures formed therein; a shaft member extending through said chamber supported by said transverse members; a slotted laminated core mounted on said shaft; field windings in said core arranged to produce a rotating field when connected to a source of polyphase current; a centrifugal fan comprising a cylindrical sleeve, supporting members within said sleeve at each end thereof to mount said sleeve for rotation about said shaft member, roller bearing assemblies mounted in cavities in said supporting members, tetra-fluoro-ethylene washer members mounted in said cavities affording a substantially frictionless dust seal around said shaft, resilient spring members to secure said washers in place and space said bearings from said members, and fin members secured to said sleeve extending between the ends of said sleeve and said end wall of said housing; an unbalance-mass eccentrically affixed to one of said end walls; and a ring member mounted on said fan for rotation adjacent said core whereby the rotating field around said core effects rotation of said centrifugal fan and mounting said blower-vibrator on a panel causes it to vibrate in accordance with the rotation of said rotor while simultaneously directing fluid in a predetermined direction.

3. An electric blower-vibrator, comprising: a housing having a plenum chamber formed therein, a passageway formed in the housing to conduct air from said chamber, and circular recesses formed in each end of said housing around said chamber; transverse perforated circular disks secured in said recesses forming end walls of said chamber; a hollow shaft member extending through said chamber supported by said end walls mounted eccentrically thereof; a slotted laminated core mounted on said shaft; field windings in said core arranged to produce a rotating field when connected to a source of polyphase current; electrical terminals mounted on said transverse disks adjacent said hollow shaft; wires extending from said terminals to said field windings through said hollow shaft; a centrifugal fan mounted for rotation about said shaft member; an unbalance-mass eccentrically affixed to said fan; and a ring member secured to said fan for rotation adjacent said core whereby the rotating field around said core effects rotation of said centrifugal fan and mounting said blower-vibrator on a panel causes it to vibrate in accordance with the rotation of said rotor while simultaneously directing fluid in a predetermined direction.

4. An electric blower-vibrator, comprising: a housing having a generally involute chamber formed therein, a tangential passageway formed in the housing to conduct air from said chamber, and circular recesses formed in each end of said housing around said chamber; transverse, perforated circular disks secured in said recesses forming end walls of said chamber; a hollow shaft member extending through said chamber supported by said end walls mounted eccentrically thereof; a slotted laminated core mounted on said shaft; field windings in said core arranged to produce a rotating field when connected to a source of polyphase current; electrical terminals mounted on said transverse disks adjacent said hollow shaft; wires extending from said terminals to said field windings through said hollow shaft; a fan mounted for rotation about said shaft member; an unbalance-mass eccentrically affixed to said fan; blower fins mounted on said fan for moving air from the space adjacent said perforated disks into said involute chamber; and a ring member secured to said fan for rotation adjacent said core whereby the rotating field around said core effects rotation of said centrifugal fan and mounting said blower-vibrator on a panel causes it to vibrate in accordance with the rotation of said rotor while simultaneously directing fluid in a predetermined direction.

5. An electric blower, comprising: a housing having a plenum chamber formed therein and a passageway formed in one wall of the housing to conduct fluid from said chamber; apertures formed in other opposite walls of said housing for access to said chamber; perforated disks secured in said apertures to form walls for said chamber; a hollow shaft member extending through said chamber and supported eccentrically by said disks; field windings including a core mounted on said shaft for producing a rotating field when connected to a source of current; electrical terminals mounted on one of said disks; electrical conductors extending from said field windings through said hollow shaft and connecting with said terminals; and a fan mounted for rotation about said shaft member and including a ring member encircling and spaced from said core and an unbalance-mass eccentrically affixed to said fan whereby the rotating field around said core effects rotation of said fan and mounting said blower-vibrator on a panel causes it to vibrate in accordance with the rotation of said rotor while simultaneously directing fluid in a predetermined direction.

6. An electric blower, comprising: a housing having a plenum chamber formed therein and a passageway formed in one wall of the housing to conduct fluid from said chamber; circular apertures formed in other opposite walls of said housing for access to said chamber; perforated circular disks secured in said apertures to form walls for said chamber, said disks having eccentrically disposed shaft-mounting holes formed therein; a hollow shaft member extending through said chamber and supported in said shaft-mounting holes thereby enabling accurate alignment of said shaft along a given axis by rotating said circular disks; field windings including a core mounted on said shaft for producing a rotating field when connected to a source of current; electrical terminals mounted on one of said disks; electrical conductors extending from said field windings through said hollow shaft to said terminals; and a fan mounted for rotation about said shaft member and including a ring member encircling and spaced from said core and an unbalance-mass eccentrically affixed to said fan whereby the rotating field around said core effects rotation of said fan and mounting said blower-vibrator on a panel causes it to vibrate in accordance with the rotation of said rotor while simultaneously directing fluid in a predetermined direction.

References Cited in the file of this patent

UNITED STATES PATENTS

| 2,207,208 | Thrush | July 9, 1940 |
| 2,482,847 | Godman | Sept. 27, 1949 |
| 2,741,992 | Glazebrook | Apr. 17, 1956 |
| 2,772,046 | Shomphe | Nov. 27, 1956 |